2,418,280

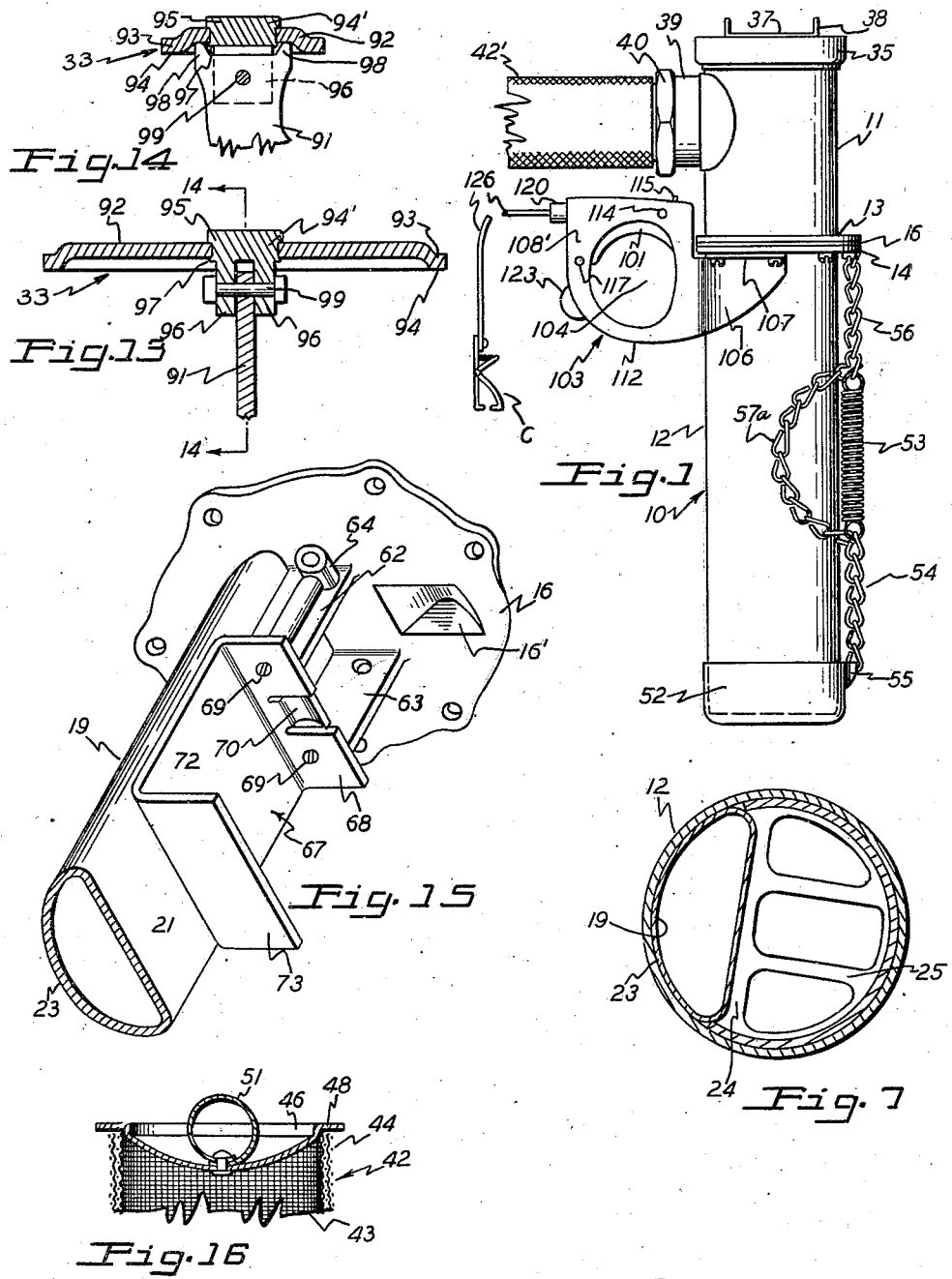

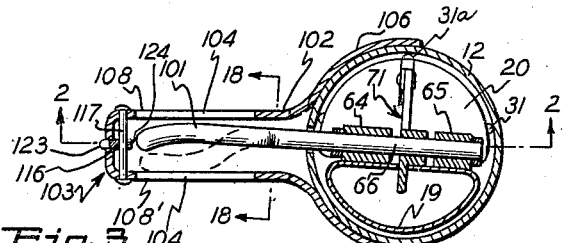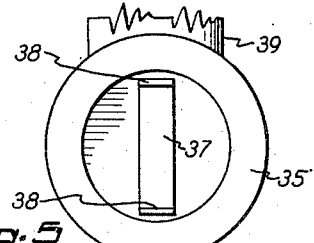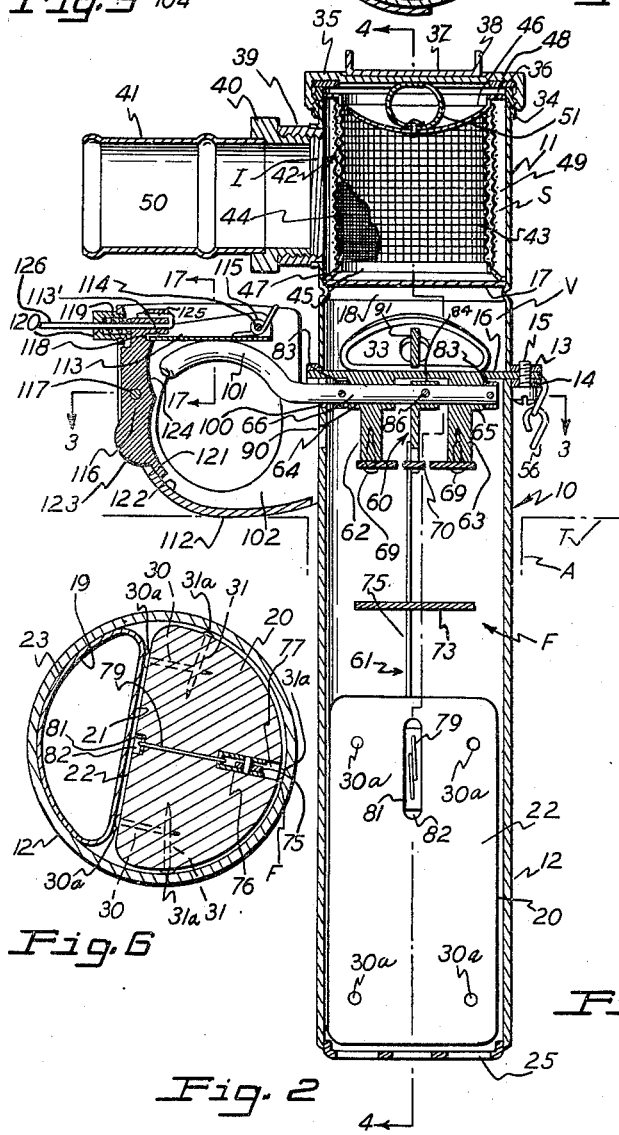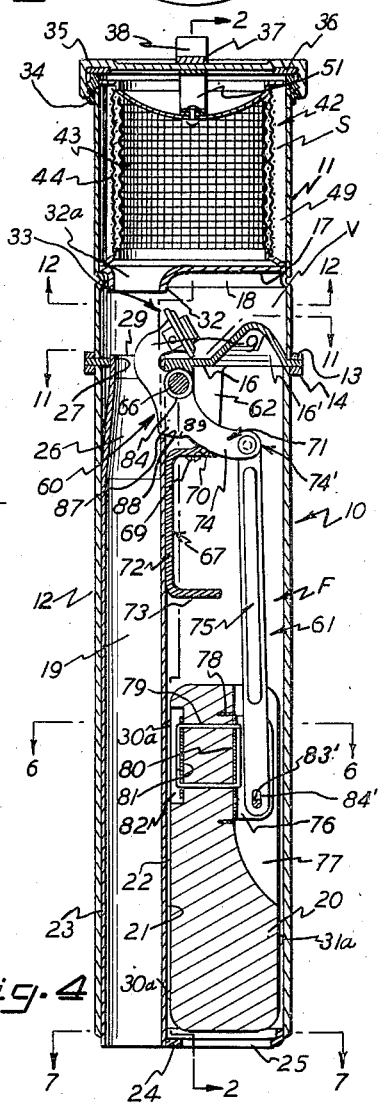

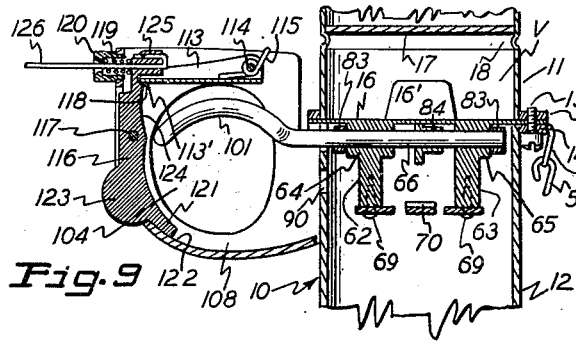
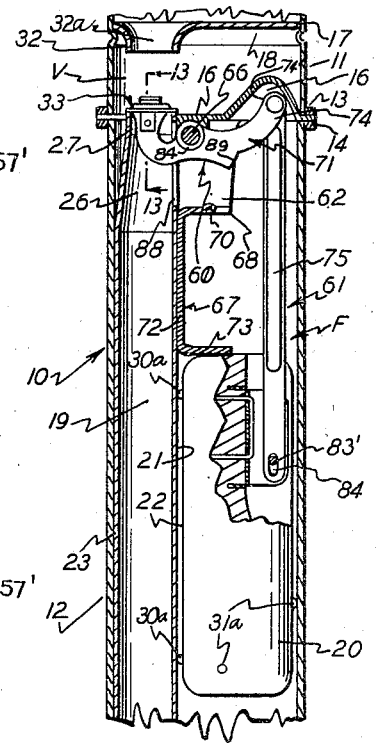
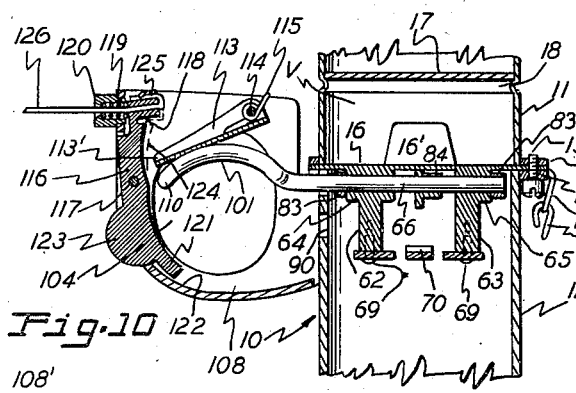
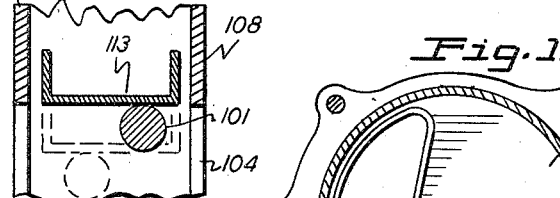
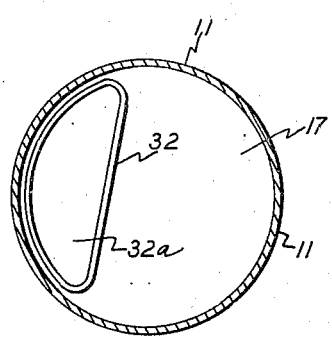
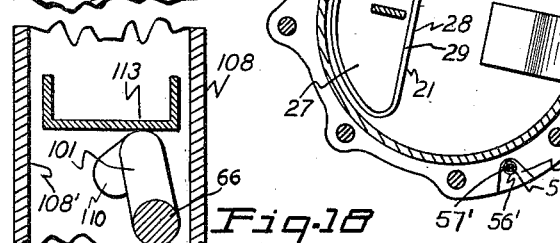
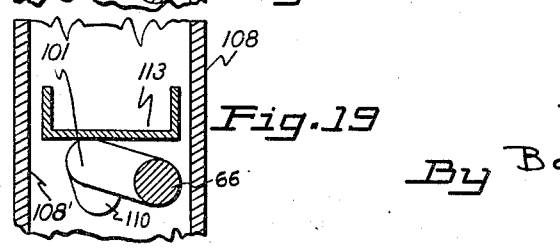
Inventor
William E. Steen Patented Apr. 1, 1947

UNITED STATES PATENT OFFICE 2,418,280

TRIP NOZZLE WITH FLOAT CONTROLLED VALVE

William E. Steen, South Pasadena, Calif., assignor to Smith Meter Company, Los Angeles, Calif., a corporation of California Application January 19, 1943, Serial No. 472,852

4 Claims. (Cl. 226—127)

This invention relates generally to hose nozzles for the delivery of liquids, and is more particularly concerned with nozzles of the trip type wherein, when the liquid in the receptacle being filled reaches a certain level, the delivery nozzle is automatically closed.

While the nozzle is adaptable for use in connection with the delivery of many different liquids and for use in filling any type of container, it is particularly well adapted for use in the delivery of gasoline to the tanks of aircraft, and even more particularly to the fuel tanks carried in the wings of such craft. Accordingly, I will describe the nozzle as put to this particular use, but it will be understood this is not to be considered as at all limitative on the invention, considered in its broader aspects.

It is the principal object of the invention to provide a nozzle of the type described above, which will perform with great efficiency, in spite of the very severe operating conditions under which it may serve. The device has found widespread use in connection with the transfer of aviation gasoline from drum containers to aircraft tanks, and in that use it will be recognized that gasoline transfers will often be made under the worst possible conditions.

It is obvious that the weight of the device must be kept to a minimum and yet it must be sufficiently sturdy to withstand very considerable abuse. Its necessary delicacy of responsiveness to controlling operations may be undisturbed by the severe conditions under which it operates. It follows that its mechanism, while of a nature to respond quickly and unerringly to control operations, must be extremely simple and present minimum danger of breaking down at crucial periods of operation.

I have also provided a very simple but efficient means for straining the gasoline as it passes through the nozzle, this means being so devised that it is susceptible of being easily and quickly cleared of screened-out extraneous matter.

While, under normal conditions, the valve of the nozzle is closed by a rising float when a predetermined level within the tank is reached, it is highly desirable that an arrangement be provided whereby the valve may be manually closed should the operator find need for such action prior to the operation of the float-control. The device contains means for accomplishing such an emergency shut-off.

I have also provided means whereby, should the nozzle be accidentally displaced from the fuel tank, the valve will be immediately automatically closed to prevent uncontrolled escape of the fuel.

Other objects and features of the invention will be made apparent from the following detailed description, reference being had to the accompanying drawings, in which:

Fig. 1 is a side elevation of a nozzle embodying my invention;

Fig. 2 is an enlarged longitudinal section through the device, being taken on the lines 2—2 of Figs. 3 and 4;

Fig. 3 is a section on line 3—3 of Fig. 2, the operating shaft and its crank being shown in elevation;

Fig. 4 is a section on line 4—4 of Fig. 2;

Fig. 5 is a top plan view of Fig. 4 with the hose connection broken away;

Fig. 6 is a section on line 6—6 of Fig. 4;

Fig. 7 is a section on line 7—7 of Fig. 4;

Fig. 8 is a fragmentary view of a portion of the mechanism shown in Fig. 4, but showing the valve moved to closed position;

Fig. 9 is a fragmentary view of a portion of the mechanism shown in Fig. 2, but showing the position occupied by the valve operating crank and shaft when the valve is closed as in Fig. 8;

Fig. 10 is a view similar to Fig. 9, except that it indicates the valve shaft as having been moved to valve-closing position by reason of the operation of a trip lever;

Fig. 11 is a section on line 11—11 of Fig. 4, but omitting the showing of the valve shaft and the crank guard;

Fig. 12 is a section on line 12—12 of Fig. 4;

Fig. 13 is an enlarged, detached section of the valve, as taken on line 13—13 of Fig. 8;

Fig. 14 is a section on line 14—14 of Fig. 13;

Fig. 15 is a perspective view of a sub-assembly made up of a partition plate, a valve shaft support and a float stop;

Fig. 16 is a detached, fragmentary section of the screen assembly, showing the position of the resilient lifting handle when in unrestrained condition;

Fig. 17 is a schematic showing of the valve shaft crank in its association with the tripping lever, the parts being in the relative positions they occupy when viewed from the position of section line 17—17 of Fig. 2;

Fig. 18 is a schematic showing of the position of the valve shaft crank when viewed from the position of section line 18—18 of Fig. 3, it being noted that this section line is normal to the inclined axis of the valve operating shaft, and that Fig. 18 is rotated into the aspect of Fig. 17; and Fig. 19 is a view similar to Fig. 18 except that the valve shaft crank has been moved to the position it will occupy when the valve is closed (Figs. 8, 9 and 10). The dotted lines in Fig. 17 indicate the relationship of the operating shaft and tripping lever when the crank is in the position of Fig. 19.

The outer casing or cylindrical housing of the nozzle is indicated generally at 10, this housing being made up, in part, of upper section 11 and lower section 12 having, respectively, opposed flanges 13 and 14, soldered to the respective sections and detachably connected to one another at 15. An intermediate plate 16 has its outer edges extended between flanges 13 and 14 and it is thus clamped in position by attachment bolts 15. As will appear, plate 16 not only forms a partition between certain chambers, but also serves as a supporting means for certain of the internal mechanism.

A partition plate 17 extends across housing section 11, the plate resting on an internally pressed bead 18 and being soldered peripherally to section 11.

Partitions 16 and 17 divide the interior of casing 10 into screen chamber S, valve chamber V and float chamber F, the delivery tube 19 extending longitudinally through section 12 and, in effect, forming one defining wall of the float chamber.

As appears from Fig. 6, float 20, in chamber F, and tube 19 are substantially complementary segments, considered in transverse cross section, the chordal side 21 of the tube being directly opposed to the chordal face 22 of the solid float 20, the tube and float, still considered in transverse cross section, substantially filling the full circle defined by casing section 12. The arcuate wall 23 of the tube nicely fits the inner peripheral face of the casing section 12, the lower end of the tube being held in this position and against rotative displacement within said section by cross bar 24 (Figs. 4 and 7) of grid 25 which, in turn, is soldered to the lower end of section 12. This grid admits to float chamber F liquid which is contained in the fuel tank into which the nozzle is projected.

The upper portion of discharge tube 19 is somewhat restricted in cross sectional area, being formed to provide a Venturi section 26 for a purpose to be described later. The extreme upper end 27 of the tube projects through an opening 28 (Fig. 11) in plate 16 and extends slightly beyond that plate, its upper edge 29 being faced off squarely to provide a valve seat. The upper end of the tube is soldered to plate 16 so the tube and plate, as a unit, may be lowered into and removed from section 12.

Float 20 is free to move longitudinally through a limited range in float chamber F, the opposed chordal faces 21 and 22 preventing rotative displacement of the float. Preferably the float is a block of light wood, such as balsa, treated externally with any suitable gasoline-impervious substance. It will be recognized, however, that a float of this particular character is not essential to the invention, considered broadly. Preferably, studs 30 and 31 (Fig. 6) are driven into the flat and arcuate faces, respectively, of the float. The rounded stud heads 30a and 31a serve as gliders or anti-friction means between the float and the float chamber walls.

Plate 17 has a downwardly extending tubular neck 32 (Figs. 4 and 12) the bore 32a of which provides an outlet or discharge port from screen chamber S to valve chamber V. The neck and port have substantially the same cross section as and are in axial alinement with seat 29, but the lower end of the neck and the seat are vertically spaced to allow requisite movement of valve 33, the details of which will be described later.

An externally threaded ferrule 34 is soldered on the upper end of casing section 11, a screen-chamber cap 35 being removably threaded on the ferrule, there preferably being a gasket 36 interposed between the top of the ferrule and the underside of the cap. A strap 36 is soldered to the upper face of the cap, the strap being turned up at its ends to provide lugs 38 whereby the cap may be grasped either by hand or by tool for tightening and loosening purposes. An internally threaded ferrule 39 extends through and is soldered to casing section 11, this ferrule defining the inlet I to the housing bore and threadably taking attachment nut 40. Hose fitting 41, extending radially from housing 10, is soldered to nut 40 and is adapted to take hose 42' which leads from any suitable source of liquid supply.

Within screen chamber S is a cylindrical, double-walled screen assembly generally indicated at 42. This assembly includes an inner and relatively coarse mesh supporting or backing-up screen 43 made, for instance, of bronze wire about .023" in diameter and the screening being about 12 mesh; and a relatively fine mesh outer screen 44 made, for instance, of Monel wire about .003" in diameter and the screening being about 150 mesh.

The inner and outer screens are in face-to-face peripheral contact and their lower and upper ends are soldered to ring 45 and cover 46, respectively. Ring 45 and cover 46 have flanges 47 and 48, respectively, which slidingly fit the bore of casing section 11, the flanges holding screen assembly 42 annularly spaced from the casing section. The annular space 49, as thus formed, is in communication with the bore 50 of fitting 41, it following that liquid introduced through hose 42' flows into space 49 around the screen assembly and through the screens 44 and 43 into the bore of assembly 42, the screened fluid being then free to flow through neck 32 to valve chamber V. It will be realized that by this arrangement, the peripheral face of the screen assembly presents a screening area of much greater effective size than would be presented were a flat screen to be provided across inlet I, port 32a, or transversely across the bore of assembly 42 between the inlet and discharge port. The advantages of the illustrated screening arrangement are obvious.

Cap or end closure 46 is concave, and at its center it is provided with a loop handle 51 made of flat spring stock whereby, when it is unrestrained, it assumes the substantially circular shape shown in Fig. 16, projecting above flange 48. However, when assembly 42 is seated on plate 17 and cap 35 is screwed home, ring 51 is somewhat flattened, as in Fig. 2, and thus, by virtue of its resiliency, exerts considerable end pressure on assembly 42, holding flange 47 tightly seated on plate 17 and thus preventing direct passage of gasoline from space 49 to port 32a. On the other hand, when occasion arises for cleaning assembly 42, it is merely necessary to unscrew cap 35 and lift the assembly by handle 51 from chamber S.

For closing and protecting the lower end of the nozzle when out of use, I provide a cap 52 (Fig. 1), the cap being releasably held on the lower end of casing section 12 by coil spring 53 which is connected by chain length 54 to cap 52 at 55 and by chain length 56 to casing flange 14, flange 14 being pierced at 56' and flange 13 being notched at 57 (Fig. 11) to accommodate the uppermost link 57' of the chain. As a safety measure to prevent the cap 52 from being lost in the event spring 53 should break, chain lengths 54 and 56 are connected by the slack chain-length 57a. Slack length 57a also prevents the spring 53 from being stretched to the breaking or permanent deformation point, should an operator carelessly exert excessive tension on the chain-and-spring assembly. The slackness of this length is such as to permit spring 53 to be expanded sufficiently to allow the placement of the cap in the position of Fig. 1, and the subsequent removal of the cap when the nozzle is to be put into operation.

Plate 16 not only serves as a chamber-defining partition and as a supporting and positioning member for the upper end of tube 19, but it also serves as a supporting and positioning member for valve assembly 60 and float assembly 61. Depending from plate 16 are horizontally spaced arms 62 and 63 which carry, respectively, drilled bosses 64 and 65 providing spaced bearings for valve shaft 66. A channel shaped member 67 has an upper flange 68 which is secured by screws 69 to the lower ends of arms 62 and 63. The central portion of flange 68 (Fig. 15) is formed to provide an upwardly bent lug 70 which forms a resilient stop for valve arm 71. The web portion 72 of member 67 lies against the flat face 21 of tube 19, while flange 73 forms a stop for limiting the upward movement of float 20, as will appear.

Valve arm 71 has an arcuate tail 74, which is pivotally connected at 74' to link 75 which, in turn, is pivotally connected to float 20. When float 20 is made of wood, as is true in the illustrated embodiment of the invention, special attachment means is provided between the float and link 75. The preferred attachment means includes member 76 of U-shaped cross section (Figs. 4 and 6) which is set into saw-slot 77 in float 20, member 76 having spurs 78 which are driven into the float at the bottom of the slot. As a further and positive means for holding member 76 properly positioned within the slot, clamping wire 79 is threaded through apertures provided in the bottom wall 80 of member 76, through the float and then through suitable apertures in backing plate 81, the latter being set into recess 82 provided at the opposite or flat face 22 of the float. Stud 83' provides a pivotal connection between link 75 and member 76, the stud passing through lost-motion slot 84' in the link.

Valve or operating shaft 66, journaled in bosses 64 and 65 and laterally offset from tube 19 below plate 16, is held against longitudinal displacement by pinned collars 83. The flat and relatively thin valve arm 71 has a hub 84 which is pinned to the shaft at 86, the arm also having a portion 87 which extends through slot 88 in tube 19. As will appear, the valve arm swings arcuately from the valve-open position of Fig. 4 to the valve-closed position of Fig. 8 and the lower edge 89 of arm portion 87, is therefore formed as an arc struck about shaft 66 as a center.

When valve 33 is open, as in Fig. 4, and liquid is flowing through the nozzle, there would be, in the absence of preventive means, a tendency for this liquid to leak into the float chamber through slot 88 around the valve arm. It is to prevent such leakage that the Venturi section 26, previously spoken of, is formed in tube 19, this Venturi section being located adjacent slot 88. The restriction of the Venturi section causes a localized increase in the velocity of the liquid flowing through the nozzle and a consequent lowered pressure in the neighborhood of the slot, the resultant slight depression being effective to tend to induce the flow of air from float chamber F into tube 19 and thus counteracting the natural tendency of the liquid to flow from tube 19 through slot 88 into the float chamber.

It will also be noted that the upper end of casing section 12 is pierced as at 90 (Fig. 2) to provide a vent for the upper end of float chamber F so no air may be trapped above the float to resist its elevation under the influence of liquid entering the bottom of the float chamber.

Valve arm 71 has an upper, arcuate portion 91 which extends through the upper end of tube 19 into valve chamber V, the free end of this upper extension carrying valve 33. Arcuate portion 91 is attached to the valve stopper or plate 92 in the manner best shown in Figs. 13 and 14. This stopper is in the form of a plate having the same general shape as the transverse cross-section of tube 19, the marginal edge 93 being pressed down and forming at its underside a face 94 adapted to seat on face or valve seat 29 of tube 19.

The connection between plate 92 and arm 91 is made through a centrally located stud 94' whose head 95 lies at one side of the plate, while the spaced arms 96 extend to the other side thereof. The stud is staked at 97 to hold it against movement with relation to plate 92, while the arms 96 take extension 91 relatively loosely between them. The extreme end of arm 91 carries projections 98 which contact the underside of plate 92, the projections being somewhat rounded and being taken relatively loosely between the opposed inner faces of flange 93. Rivet 99 forms a relative loose connection between stud 94 and arcuate portion 91. The relative looseness between arm 91 and plate 92 permits the plate to adjust itself to seat 29.

When the valve is in the open condition of Fig. 4, it will be noticed that plate 92 is laterally offset from neck 32 and is thus out of the direct path of liquid flowing from port 32a to tube 19. Relatively slight counter-clockwise movement of the valve, as caused by upward movement of float 20 or rotation of shaft 66 under conditions to be described, brings the leading edge of plate 92 beneath port 32a, and the descending liquid, in its rush, will catch the leading edge of the plate and thus snap the valve closed, this action stopping further liquid flow through the nozzle and lifting float 20 to its upper limit of travel (Fig. 3). Plate 16 has an upwardly extending cavity 16' to accommodate tail 74 when the valve is closed.

Valve shaft 66 extends through opening 100 in casing section 12 and, a short distance beyond the section flange 14, is bent to form a finger-grip crank 101. Crank 101 lies between the cheek plates 102 of guard 103. This guard is located immediately beneath hose fitting 41 so the operator may grasp the hose, close to the nozzle, as a handle and reach with one finger through the openings 104 in the cheek plates so he may operate the crank 101, it thus being a one-handed operation to manipulate the nozzle as a whole and to operate the valve shaft crank.

Cheek plates 102 have portions 106, arcuate as viewed in plan, which partly encircle casing section 12 and which have flanges 107 screw-connected to the underside of casing flange 14.

The parallel arm portions 108 and 108' of the cheek plates are spaced apart to accommodate crank 101, in its movement, between them. It will be noted that while said arm portions are parallel to the axis of hose fitting 41, shaft 66 is inclined with respect to this axis and hence to the arm portions (Fig. 3) and, when valve 33 is open, crank 101 lies closely adjacent arm portion 108' (full lines in Fig. 3 and Figs. 17 and 18). When the valve is in the closed condition of Fig. 8, shaft 66 has been rotated to a position bringing crank 101 into the dotted line position of Fig. 3 and the full line positions of Figs. 9, 10 and 19, where it lies quite close to arm portion 108. Were shaft 66 parallel to arm portions 108, 108', crank 101 would have to be mid-way between those plates at one end of the crank throw. In that case the extent of crank throw would be limited to the travel between that central position and a position where the crank was adjacent one of the arm portions 108', and it would be possible for the crank to get on dead center. But by inclining the valve shaft as shown, the throw of crank 101 can be extended to a degree which is allowed by its movement from one cheek plate almost to the other without getting on dead center.

It will be apparent that with the valve closed, as in Fig. 8—crank 101 then being in the position of Figs. 9 and 19—finger pressure exerted against crank 101 swings that crank to the position of Figs. 2, 3 (full line) and 18, thus rotating shaft 66 in a clockwise direction, as viewed in Fig. 3 and opening valve 33 (Figs. 2 and 4). To prevent the finger from slipping from the end of crank 101 when it is in the position of Figs. 19 and 9, the free tip 110 of the crank is bent forwardly so that it is approximately parallel to plate 108'.

In normal operation the nozzle, with valve 33 closed, is inserted in the filling aperture of the tank. I have schematically indicated such a tank at T and a filling aperture at A (Fig. 2). The nozzle is lowered until the lower edge 112 of guard 103 comes to rest on top tank T, it being noted that vent 90, being above edge 112, is open to the atmosphere. Thus, guard 103 may be considered a stop for limiting the extent to which the nozzle enters the tank, and to insure that the float chamber is always vented.

Crank 101 may at this time be in the position of Figs. 9 and 19. The operator then presses upwardly on crank 101, swinging it to the positions of Figs. 2, 3 and 18, thus rotating valve 33 to open position and lowering the float to the position of Figs. 2 and 4. The tail portion 74 of valve arm 71 comes to rest on member 70 which thus forms a stop for limiting the opening movement of valve 33 and also, through link 75, limiting the downward movement of the float.

With the subsequent delivery of liquid through hose 42', the liquid flow is through screen assembly 42, valve chamber V and discharge tube 19 and into tank T, as has been described.

When the liquid in tank T rises to such a level in the float chamber F as to elevate float 20 sufficiently to thrust link 75 upwardly and cause counter-clockwise (Fig. 4) movement of arm 71, the leading edge of plate 92 is caught in the rush of liquid through neck 32 and, as has been described, snaps to closed position (Fig. 8). This movement completes the elevation of float 20 which is checked in its ascent by stop 73. However, lost-motion connection 83—84 insures the full seating of plate 92 on valve seat 29, since valve 33 is capable of a certain amount of counter-clockwise movement (Fig. 8) after float 20 has reached stop 73.

While the rising of the float is normally depended upon for closing or initiating the closing of valve 33 and thus automatically cutting off flow through the nozzle when a predetermined amount of liquid is within tank T, it is highly desirable that, in an emergency, there be means for accomplishing this shut-off prior to the closing action of the float. The means I have provided may be actuated either manually or automatically, the automatic trip coming into play in the event the nozzle should start to fall from the tank.

This emergency closing mechanism is in the form of a cocked, spring-actuated member or trip which, when tripped, acts on valve shaft crank 101 to shift it from the position of Figs. 2, 17 and 18 to the positions of Figs. 10 and 19, thus to rotate valve 33 to closed position. The trip is in the form of a lever 113 of channel transverse cross-section, which is pivoted at 114 between plates 108, 108'. A torsion spring 115 coacts with guard 103 and lever 113 in a manner tending at all times to rotate the lever in a counter-clockwise direction, as viewed in Fig. 9.

When the vale is open, trip 113 is in the position of Figs. 2 and 17, lying immediately behind crank 101. It is restrained against the action of spring 115 by a trigger 116 pivoted at 117 between plates 108, 108'. The distal end 113' of trip 113 fits into a notch 118 in the trigger, and coil spring 119, housed in guard bushing 120, tends to swing the trigger in a clockwise direction, as viewed in Fig. 9, to hold the trip in the position of Figs. 2 and 9. The clockwise movement of trigger 116 is limited by the contact of lever nose 121 with the inner face 122 of guard 103.

Trigger 116 has a thumb piece or pressure button 123 which projects between plates 108, 108' to the exterior of the guard, and should occasion arise for closing the valve prior to its float-actuation, the operator merely presses inwardly on button 123 (Fig. 10) thus swinging trigger 116 against the action of spring 119 and clearing notch 118 from the end of trip 113. Spring 115 then thrusts trip 113 in a counter-clockwise direction, as viewed in Fig. 9, and, since crank 101 is a little off center when in the position of Figs. 2, 17 and 18, this movement of trip 113 forces the crank to the postion of Figs. 10 and 19, thus rotating shaft 66 in a direction to close valve 33.

When button 123 is released, trigger 116 is swung by spring 119 back to the dotted line position of Fig. 10. Then, when the operator subsequently actuates crank 101 to re-open the valve, the crank forces the trip back to the position of Fig. 9, the end 113' of the trip engaging cam face 124 of the trigger to rotate the trigger against the action of spring 119 until end 113' registers with notch 118, whereupon spring 119 presses the trigger back to trip-holding position.

Trigger 116 also has connected to it at 125 a safety wire 126 which extends through spring 119 and bushing 120. At the end of wire 126 is a clip or other releasable fastening means C which is adapted to be clamped to some stationary member such as a part of the structure carrying tank T. Clip C is so applied to the stationary member that wire 126 is sufficiently slack as not to interfere with normal bodily movement of the nozzle. However, should the nozzle fall or be suddenly snatched from the tank prior to the closing of valve 33, the wire, being attached to a stationary object, is put under sudden tension and trigger 116 is thus pulled to release position against the action of spring 119. Thereupon trip 113 is immediately released for movement under the power of spring 115 to throw the crank to the position of Fig. 10 and thus effect an emergency closure of the valve. The trip may be reset to the position of Fig. 9 in the same manner as described in connection with its re-setting after its release by pressing member 123.

It will be seen that in spite of the amount of mechanism provided to bring about all the above results, the entire internal assembly is such that it is readily taken within a casing of a diameter to fit the normal opening of a fuel tank.

While I have shown a preferred embodiment of the invention, various changes in design, structure and arrangement may be made without departing from the spirit and scope of the appended claims.

I claim:

1. In a device of the character described, a vertical, tubular housing having an inlet near its upper end, a detachable partition plate across the bore of the housing below the inlet, a delivery tube supported by and depending from the plate, the upper end of the tube opening to the housing bore above the plate, a valve supported on the plate for movement to and from a position closing the upper end of the delivery tube, a float below the plate, an operative connection between the valve and float whereby upward movement of the float moves the valve toward closing position, and a stop supported by the plate and adapted to limit upward movement of the float.

2. In a device of the character described, a vertical, tubular housing having an inlet near its upper end, a detachable partition plate across the bore of the housing below the inlet, a delivery tube supported by and depending from the plate, the upper end of the tube opening to the housing bore above the plate, a valve supported on the plate for movement to and from a position closing the upper end of the delivery tube, a stop supported by the plate and adapted to limit the extent of opening movement of the valve, a float below the plate, an operative connection between the valve and float whereby upward movement of the float moves the valve toward closing position, and a stop supported by the plate and adapted to limit upward movement of the float.

3. In a device of the character described, a vertical, tubular housing having an inlet near its upper end, a pair of vertically spaced plates extending across the housing bore with the upper plate spaced below the inlet to define the lower end of a screen chamber and with the lower plate spaced above the lower end of the housing to define the top of a float chamber, the spaced plates defining between them a valve chamber, a float in the float chamber, there being a discharge port opening from the screen chamber to the valve chamber, a discharge tube extending downwardly from the lower plate and opening at its upper end to the valve chamber, a valve in the valve chamber for controlling fluid flow through the bore of the tube, and an operative connection between the float and valve whereby upward movement of the float moves the valve toward closing position.

4. In a device of the character described, a tubular housing having an inlet, there being a discharge passageway through the housing, a valve shaft extending transversely of the housing bore, a valve on the shaft and movable to and from a position closing said passageway, a float in the housing and connected to the valve for moving it toward closing position when the float rises, and a crank on said shaft, said crank being at the exterior of the housing and being operative to rotate the shaft and thereby move the valve to open the passageway.

WILLIAM E. STEEN.

REFERENCES CITED

The following references are of record in the file of this patent:

UNITED STATES PATENTS

| Number | Name | Date |
| --- | --- | --- |
| 2,008,299 | Etzel | July 16, 1935 |
| 1,940,923 | Stringer | Dec. 26, 1933 |
| 1,689,066 | Baxter | Oct. 23, 1928 |
| 2,310,631 | Hansen | Feb. 9, 1943 |
| 2,060,570 | Hansen | Nov. 10, 1936 |
| 1,930,954 | Hansen | Oct. 17, 1933 |
| 1,923,574 | Hansen | Aug. 22, 1933 |
| 2,035,438 | Warren | Mar. 24, 1936 |
| 1,660,627 | Segelken | Feb. 28, 1928 |
| 1,539,081 | Fritz | May 26, 1925 |
| 328,827 | Ward | Oct. 20, 1885 |